(12) United States Patent
Boyd, III et al.

(10) Patent No.: US 12,723,368 B2
(45) Date of Patent: Sep. 1, 2026

(54) STABILIZER ARM LOCK

(71) Applicant: KUBOTA CORPORATION, Osaka (JP)

(72) Inventors: Robert Stewart Boyd, III, Flowery Branch, GA (US); Tyler Nicholas Brown, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 211 days.

(21) Appl. No.: 18/817,400

(22) Filed: Aug. 28, 2024

(65) Prior Publication Data

US 2026/0062888 A1 Mar. 5, 2026

(51) Int. Cl.

| | |
|---|---|
| ***E02F 9/08*** | (2006.01) |
| ***B60S 9/10*** | (2006.01) |
| ***B66C 23/80*** | (2006.01) |
| ***E02F 3/32*** | (2006.01) |

(52) U.S. Cl.

CPC ................ *E02F 9/085* (2013.01); *E02F 3/32* (2013.01); *B60S 9/10* (2013.01); *B66C 23/80* (2013.01)

(58) Field of Classification Search

CPC ............. B60S 9/10; B66C 23/80; E02F 9/085

See application file for complete search history.

(56) References Cited

U.S. PATENT DOCUMENTS

| | | | | |
|---|---|---|---|---|
| 3,164,261 A * | 1/1965 | Larson | B66C 23/80 248/240.2 |
| 4,236,643 A * | 12/1980 | Schmitz | E02F 9/085 280/764.1 |
| 4,295,661 A * | 10/1981 | Maurer | B66C 23/80 280/765.1 |
| 2019/0323202 A1* | 10/2019 | Nadaoka | E02F 3/968 |

* cited by examiner

*Primary Examiner* — Alexander K Garlen

(74) *Attorney, Agent, or Firm* — GREENBLUM & BERNSTEIN, P.L.C.

(57) ABSTRACT

A stabilizer arm lock including a frame member, a stabilizer arm having a first end pivotally attached to the frame, a locking pin operable to slidably move within the stabilizer arm, a cam surface on the frame member, and a biasing member operable to bias the locking pin into engagement with the cam surface.

20 Claims, 14 Drawing Sheets

STABILIZER ARM LOCK

BACKGROUND OF THE DISCLOSURE

1. Field of the Disclosure

The present disclosure relates to a tractor stabilizer arm, and more specifically, to a tractor stabilizer arm lock and a method of using a tractor stabilizer arm lock.

2. Background of the Disclosure

A backhoe—also called rear actor or back actor—is a type of excavating equipment, or excavator with a digging bucket on the end of a two-part articulated arm, for example. The backhoe is typically mounted on the back of a tractor or front loader. The section of the arm closest to the vehicle is known as the boom, while the section that carries the bucket is known as the dipper (or dipper-stick). The boom is attached to the tractor through a pivot called the king-post. The king-post allows the arm to pivot left and right, typically through a range of 180 to 200 degrees, and also enables lifting and lowering movements. The term "backhoe" refers to the action of the bucket, not its location on the vehicle. That is, a backhoe digs by drawing earth backwards (rather than lifting material with a forward motion like a person shoveling, a steam shovel, or a bulldozer).

A tractor-loader backhoe (TLB) is a tractor-like vehicle with a backhoe at the rear, a front loader on the other and a swiveling seat to position the operator facing whichever direction is needed at the time. This arrangement may be referred to as simply a backhoe, or when on a chassis originally derived from farm tractors, a tractor-loader backhoe. (A backhoe on its own dedicated chassis may also be referred to as an excavator.)

When in operation, a backhoe may utilize stabilizer arms on each side of the vehicle to stabilize the vehicle. The stabilizer arms are lowered from a raised storage position to a deployed position, in which the feet of the stabilizer arms are maintained in contact with the ground. When the stabilizer arms are not in use (e.g., not in or being moved to the deployed position), the stabilizer arms are moved to their respective storage positions. The stabilizer arms are raised and lowered with respective hydraulic cylinders.

If a cylinder leaks hydraulic fluid, however, the stabilizer arm in the storage position will slowly lower due to this leak. Thus, if there is no lock holding the stabilizer arm in the storage position, the stabilizer arm will lower until it hits the ground.

Approaches to solving the problem of the lowering stabilizer arm include "latches" that mechanically engage with the stabilizer arm and prevent the stabilizer arm from unintentionally lowering. These approaches, however, each require an operator to perform some action other than normal backhoe function to engage and disengage the lock. That is, each of these approaches require an operator to perform some latching or unlatching action to engage and/or disengage the latch.

Thus, there is a need in the art for an improved stabilizer arm lock that does not require operator to perform some action other than normal backhoe function to engage and/or disengage the stabilizer arm lock.

SUMMARY OF THE EMBODIMENTS OF THE DISCLOSURE

Aspects of the present disclosure are directed to an improved stabilizer arm lock that does not require an operator to perform some action other than normal backhoe function to engage and/or disengage the stabilizer arm lock.

By implementing aspects of the disclosure, a user can ensure each stabilizer arm remains locked in the storage position without needing to manually engage a latching mechanism. Likewise, a user can move each of the stabilizer arms out of the storage position without needing to manually dis-engage respective latching mechanisms. In such a manner, a user can more efficiently and safely operate the vehicle when deploying (lowering) the stabilizer arms and storing (raising) the stabilizer arms.

Aspects of the present disclosure are directed to a stabilizer arm lock comprising a frame member, a stabilizer arm having a first end pivotally attached to the frame, a locking pin operable to slidably move within the stabilizer arm, a cam surface on the frame member, and a biasing member operable to bias the locking pin into engagement with the cam surface.

In embodiments, engagement of the locking pin with a lock position of the cam surface is operable to maintain the stabilizer arm in the storage position.

In embodiments, the stabilizer arm comprises a slot-shaped opening and the locking pin traverses the opening and is operable to slide in the opening towards and away from the cam surface.

In embodiments, the stabilizer arm is operable to pivot from a storage position to a deployed position.

In additional embodiments, the stabilizer arm lock further comprises a cylinder connected to the frame and to the stabilizer arm, and operable to move the stabilizer arm from the storage position to the deployed position.

In further embodiments, the biasing member comprises a spring.

In yet further embodiments, the biasing member is arranged in an interior cavity of the stabilizer arm.

In embodiments, the stabilizer arm further comprises a restrainer operable to maintain the biasing member in relative position within the stabilizer arm.

In embodiments, the restrainer comprises a bolt traversing the stabilizer arm.

In additional embodiments, the cam surface includes a lock position and a usage range.

In embodiments, the cam surface further includes a second transition point between the lock position and the usage range.

In further embodiments, the second transition point between the lock position and the usage range is a protrusion on the cam surface.

In yet further embodiments, as the stabilizer arm is lowered from a storage position, the locking pin moves within the stabilizer arm in direction against the biasing force of the spring to move from contact with the lock position of the cam surface, over the second transition point, and into contact with the usage range of the cam surface.

In embodiments, the cam surface further includes an assembly position.

In embodiments, the cam surface further includes a first transition point between the assembly position and the lock position.

In embodiments, the first transition point between the lock position and the assembly position is a protrusion on the cam surface.

In additional embodiments, as the stabilizer arm is moved from the storage position to the assembly position, the locking pin moves within the stabilizer arm in direction against the biasing force of the spring to move from contact with the storage position, over the first transition point, and into contact with the assembly position of the cam surface.

In further embodiments, the biasing force of the spring pressing the locking pin into contact with the lock position is greater than a rotational gravitational force acting on the stabilizer arm, such that the stabilizer arm in a storage position does not move out of the storage position due to the rotational gravitational force acting on the stabilizer arm.

In yet further embodiments, the locking pin comprises a stem extending perpendicularly to a longitudinal direction of the locking pin and along a direction of movement of the locking pin, wherein the stem is operable to retain the locking pin positioned relative to the biasing member.

In embodiments, a user can ensure the stabilizer arm remains locked in the storage position without needing to manually engage a latching mechanism.

In embodiments, a user can move the stabilizer arm into and out of a locked storage position without needing to manually engage or dis-engage a latching mechanism.

In certain embodiments, the cam surface includes a first cam surface and a second cam surface spaced from the first cam surface in a direction parallel to a pivoting axis direction of the stabilizer arm.

In embodiments, the locking pin is maintained in contact with the first cam surface and second cam surface.

Additional aspects of the present disclosure are directed to a method of operating a stabilizer arm having a stabilizer arm lock, the stabilizer arm lock comprising a frame member, the stabilizer arm, which includes a first end pivotally attached to the frame, a locking pin operable to slidably move within the stabilizer arm, a cam surface on the frame member, and a biasing member operable to bias the locking pin into engagement with the cam surface. The method comprises moving the stabilizer arm from a usage position to a storage position, wherein the locking pin moves within the stabilizer arm in direction against the biasing force of the spring to move from contact with a usage range of the cam surface, over a protruding point on the cam surface, and into contact with a lock position of the cam surface. A biasing force of the biasing member pressing the locking pin into contact with the lock position is greater than a rotational gravitational force acting on the stabilizer arm so as to lock the stabilizer arm in the storage position and prevent the stabilizer arm from inadvertently moving out of the storage position.

BRIEF DESCRIPTION OF THE DRAWINGS

The particulars shown herein are by way of example and for purposes of illustrative discussion of exemplary embodiments of aspects of the present disclosure only and are presented in the cause of providing what is believed to be the most useful and readily understood description of the principles and conceptual aspects of the present disclosure. In this regard, no attempt is made to show structural details in more detail than is necessary for the fundamental understanding of the aspects of the present disclosure, the description taken with the drawings making apparent to those skilled in the art how the forms of the aspects of the present disclosure may be embodied in practice.

Hereafter, embodiments of the present disclosure are described with reference to the drawings. In this detailed description, unless indicated otherwise, a word "front" means the front (forward) side with respect to a vehicle body front/rear direction (traveling direction). A word "rear" or "back" means the rear/back (rearward or reverse) side with respect to the vehicle body front/back direction (traveling direction). Further, a language "left/right direction" or "lateral direction" means a vehicle body transverse direction (vehicle body width direction) perpendicular to the vehicle body front/rear direction. Also, a word "upper" and a word "lower" or "downward" respectively refer to positional relationship in the perpendicular direction (vertical direction) of the vehicle body, indicating relationship in terms of ground clearance height.

DETAILED DESCRIPTION OF THE DISCLOSURE

As used herein, the singular forms "a," "an," and "the" include the plural reference unless the context clearly dictates otherwise. For example, reference to "a magnetic material" would also mean that mixtures of one or more magnetic materials can be present unless specifically excluded. As used herein, the indefinite article “a” indicates one as well as more than one and does not necessarily limit its referent noun to the singular.

As used herein, the terms “about” and “approximately” indicate that the amount or value in question may be the specific value designated or some other value in its neighborhood. Generally, the terms “about” and “approximately” denoting a certain value is intended to denote a range within ±5% of the value. As one example, the phrase “about 100” denotes a range of 100±5, i.e., a range from 95 to 105. Generally, when the terms “about” and “approximately” are used, it can be expected that similar results or effects according to the disclosure can be obtained within a range of ±5% of the indicated value.

As used herein, the term “and/or” indicates that either all or only one of the elements of said group may be present. For example, “A and/or B” shall mean “only A, or only B, or both A and B”. In the case of “only A”, the term also covers the possibility that B is absent, i.e. “only A, but not B”.

The term “substantially parallel” refers to deviating less than 20° from parallel alignment and the term “substantially perpendicular” refers to deviating less than 20° from perpendicular alignment. The term “parallel” refers to deviating less than 5° from mathematically exact parallel alignment. Similarly “perpendicular” refers to deviating less than 5° from mathematically exact perpendicular alignment.

The term “at least partially” is intended to denote that the following property is fulfilled to a certain extent or completely.

The terms “substantially” and “essentially” are used to denote that the following feature, property or parameter is either completely (entirely) realized or satisfied or to a major degree that does not adversely affect the intended result.

The term “comprising” as used herein is intended to be non-exclusive and open-ended. Thus, for example a composition comprising a compound A may include other compounds besides A. However, the term “comprising” also covers the more restrictive meanings of “consisting essentially of” and “consisting of”, so that for example “a composition comprising a compound A” may also (essentially) consist of the compound A.

The various embodiments disclosed herein can be used separately and in various combinations unless specifically stated to the contrary.

Figure 1:
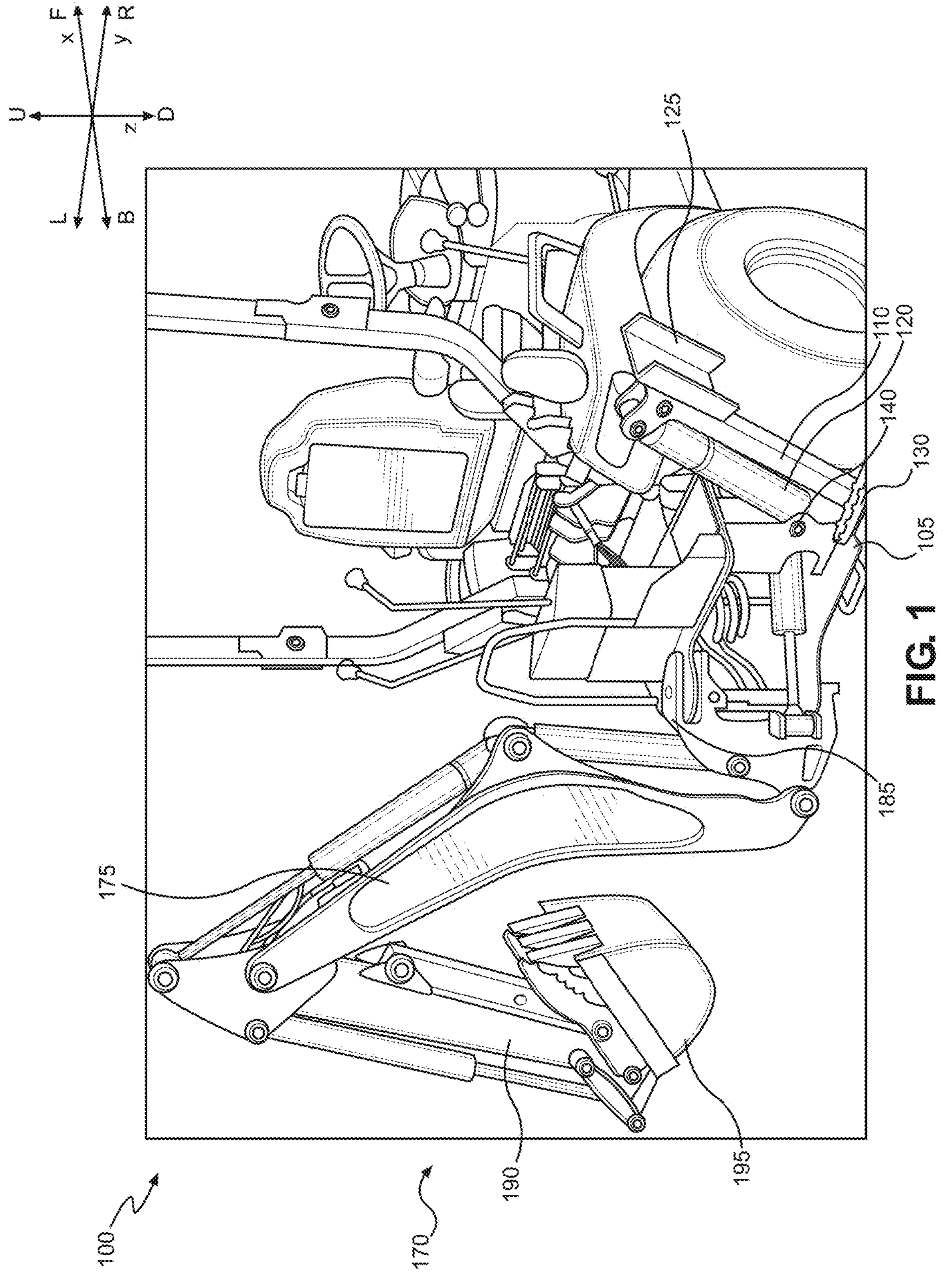
FIG. 1 shows a perspective view of an exemplary backhoe tractor.

FIG. 1 shows a perspective view of an exemplary backhoe tractor 100. As shown in FIG. 1, the backhoe tractor 100 includes a backhoe 170 mounted on the back thereof. The boom 175 is the long piece of the backhoe arm attached to the tractor 100 through the king-post pivot 185 and is located closest to the cab. The king-post 185 allows the arm to pivot left and right, typically through a range of 180 to 200 degrees, and also enables lifting and lowering movements. A bucket 195 is attached to the end of the dipper 190, which is connected to the boom 175. As shown in FIG. 1, the front (forward) side F with respect to a vehicle body front/rear direction (traveling direction) and the rear or back (rearward, back, or reverse) side B are shown extending along the x-axis with respect to the vehicle body front/rear direction (traveling direction). Additionally, the left side L with respect to a vehicle body “left/right direction” or “lateral direction” and the right side R are shown extending along the y-axis with respect to the vehicle body left/right direction (vehicle body width direction). Also, the upper side U and a lower or downward side D respectively refer to positional relationship in the perpendicular direction (vertical direction) of the vehicle body, indicating relationship in terms of ground clearance height.

As shown in FIG. 1, the backhoe tractor 100 includes a frame 105 and stabilizer arms 110 (only one shown) attached to the frame at respective pivots 130. A foot 125 is attached to the other end of the stabilizer arm 110. A cylinder 120 (e.g., hydraulic cylinder) is attached to the frame 105 via a cylinder pivot 140 and to the stabilizer arm 110 (e.g., via the foot 125). When in operation, the backhoe 100 may utilize the stabilizer arms 110 on each side of the vehicle to stabilize the vehicle. The stabilizer arms 110 are lowered from a raised storage position to a deployed position, in which the feet 125 of the stabilizer arms 110 are maintained in contact with the ground (via a force of the cylinder 120). When the stabilizer arms 110 are not in use (e.g., not in or being moved to the deployed position), the stabilizer arms 110 are moved to their respective storage positions (which is shown in FIG. 1). The stabilizer arms 110 are raised and lowered with the respective hydraulic cylinders 120.

Figure 2:
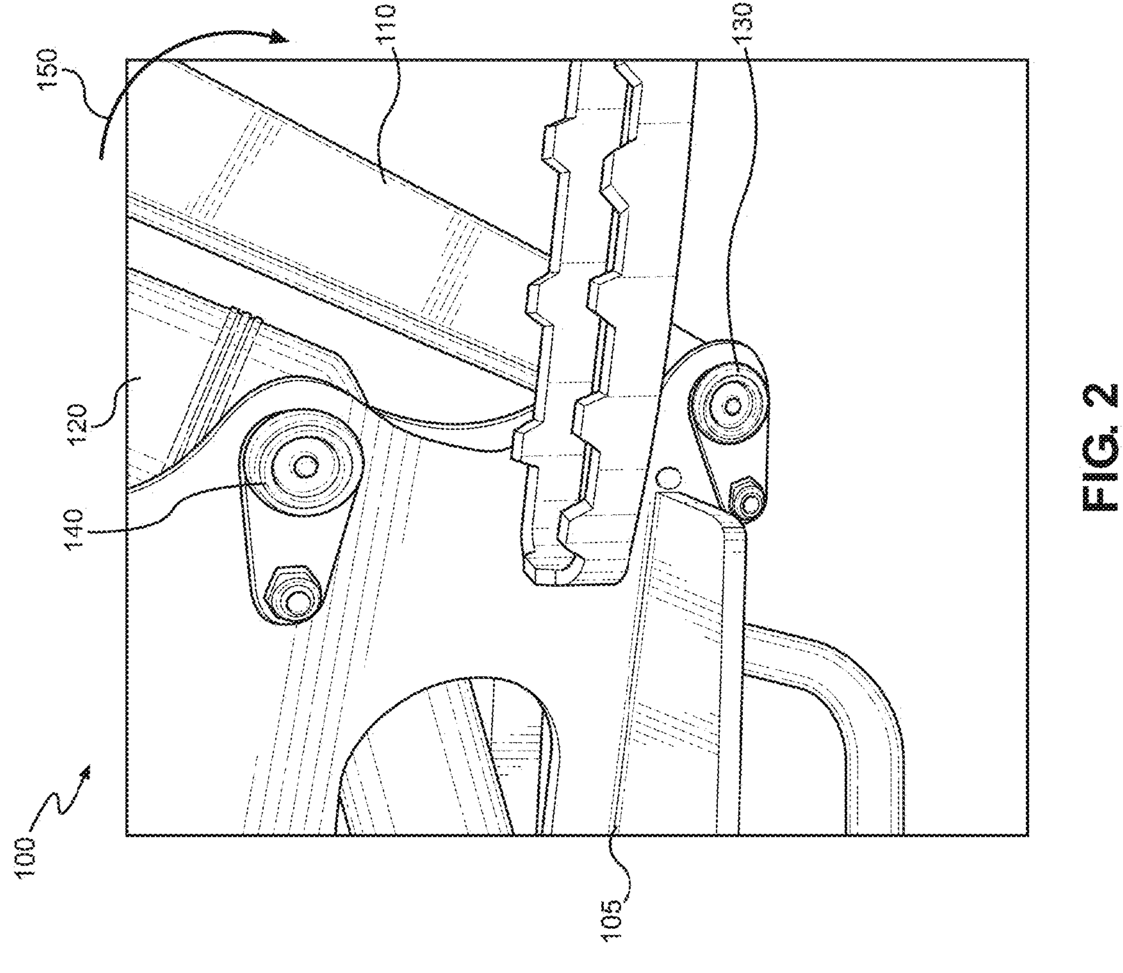
FIG. 2 shows a close-up view of a rear side of the backhoe tractor showing a connection between the frame and a stabilizer arm.

FIG. 2 shows a close-up view of a rear side of the backhoe tractor 100 showing a connection between the frame 105 and a stabilizer arm 110. As shown in FIG. 2, the backhoe tractor 100 includes a frame 105 and stabilizer arms 110 (only one shown) attached to the frame at respective pivots 130. A foot (not shown) is attached to the other end of the stabilizer arm 110. The cylinder 120 is attached to the frame 105 via the cylinder pivot 140 and attached to the other end of the stabilizer arm 110 (e.g., via the foot). When in operation, the backhoe 100 may utilize the stabilizer arms on each side of the vehicle to stabilize the vehicle. The stabilizer arms 110 are lowered from a raised storage position (shown in FIG. 1) in a direction 150 to a deployed position (not shown), in which the feet 125 of the stabilizer arms 110 are maintained in contact with the ground. If a cylinder leaks hydraulic fluid, however, the stabilizer arm 110 in the storage position may slowly lower in direction 150 due to the leak of hydraulic fluid. As shown in FIG. 2, with this arrangement, there is no lock holding the stabilizer arm 110 in the storage position. Consequently, the stabilizer arm 110 will lower in direction 150 until it hits the ground. That is, the stabilizer arm in a stored position may unintentionally move to a deployed position.

Figures 3A, 3B:
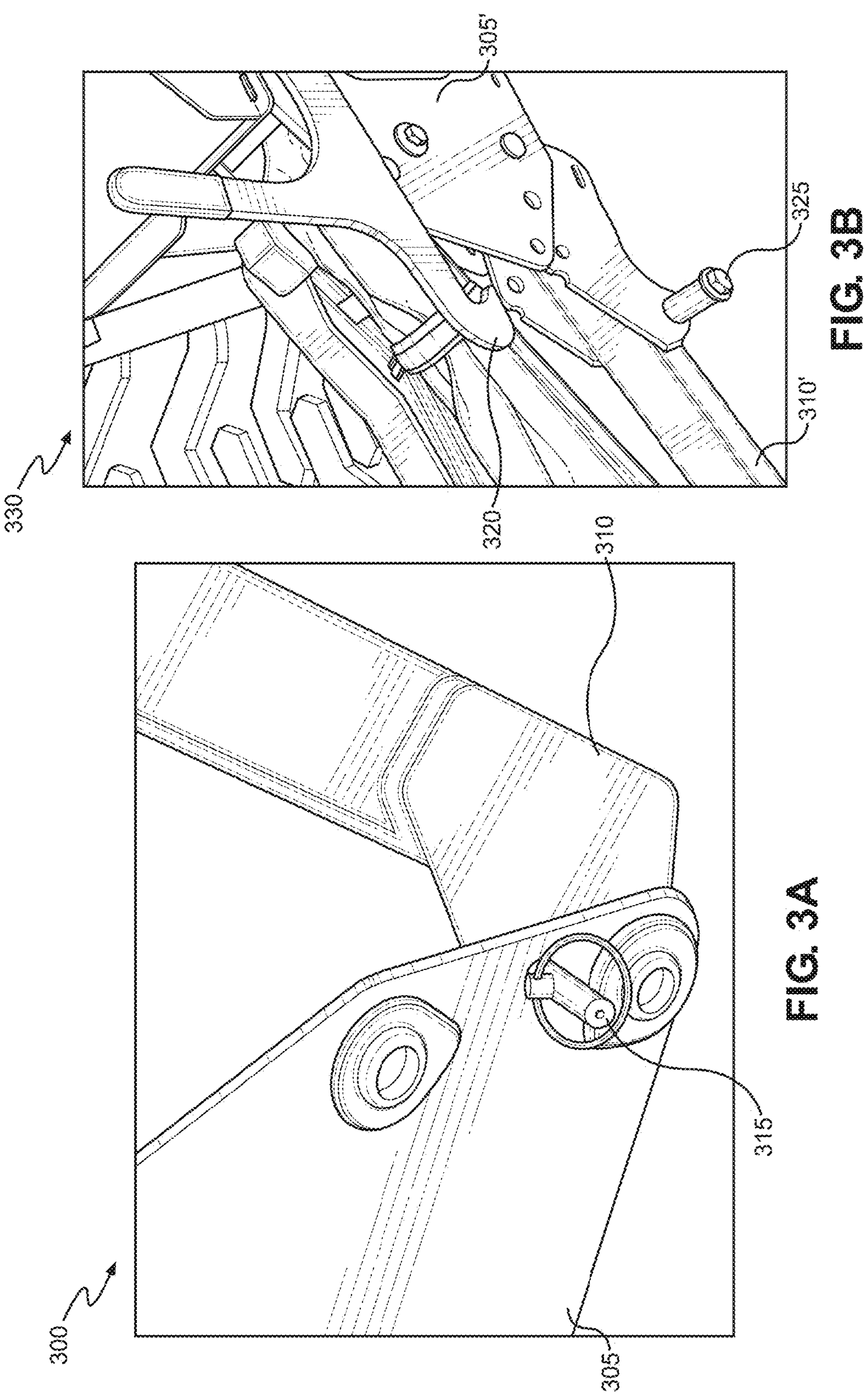
FIG. 3A shows a rear side of a vehicle showing an insertion pin latching mechanism to maintain a stabilizer arm in a storage position.
FIG. 3B shows a rear side of a vehicle showing an arm/pin latching mechanism to maintain a stabilizer arm in a storage position.

FIG. 3A shows a rear side of a vehicle 300 showing an insertion pin latching mechanism 315 to maintain a stabilizer arm 310 in a storage position. As shown in FIG. 3A, the vehicle 300 includes a frame 305 and stabilizer arms 310 (only one shown) attached to the frame at respective pivots. As shown in FIG. 3A, with this arrangement, the insertion pin latching mechanism 315 holds the stabilizer arm 310 in the storage position. Consequently, the stabilizer arm 310 in the stored position is prevented from inadvertently or unintentionally contacting the ground (for example, in the event hydraulic fluid leaks from the cylinder). As noted above, however, this arrangement requires an operator to perform some action other than normal backhoe function to engage and disengage the latching mechanism. That is, this approach requires an operator to remove (or insert) the insertion pin to engage and/or disengage the insertion pin latching mechanism 315.

FIG. 3B shows a rear side of a vehicle 330 showing an arm 320 and a pin 325 of an arm/pin latching mechanism to maintain a stabilizer arm 310' in a storage position. As shown in FIG. 3B, the vehicle 330 includes a frame 305' and stabilizer arms 310' (only one shown) attached to the frame at respective pivots. As shown in FIG. 3B, with this arrangement, the arm 320 (which is attached to the frame) is rotated to engage the pin 325 (which may be attached to the stabilizer arm or a component connected to the stabilizer arm) such that the arm/pin latching mechanism holds the stabilizer arm 310' in the storage position. Consequently, the stabilizer arm 310' is prevented from inadvertently hitting the ground (even in the event hydraulic fluid leaks from the cylinder). This arrangement, however, also requires an operator to perform some action other than normal backhoe function to engage the lock. That is, this approach requires an operator to rotate the arm 320 to engage/disengage the pin 325 to engage and/or disengage the arm/pin latching mechanism.

Figures 3C, 3D:
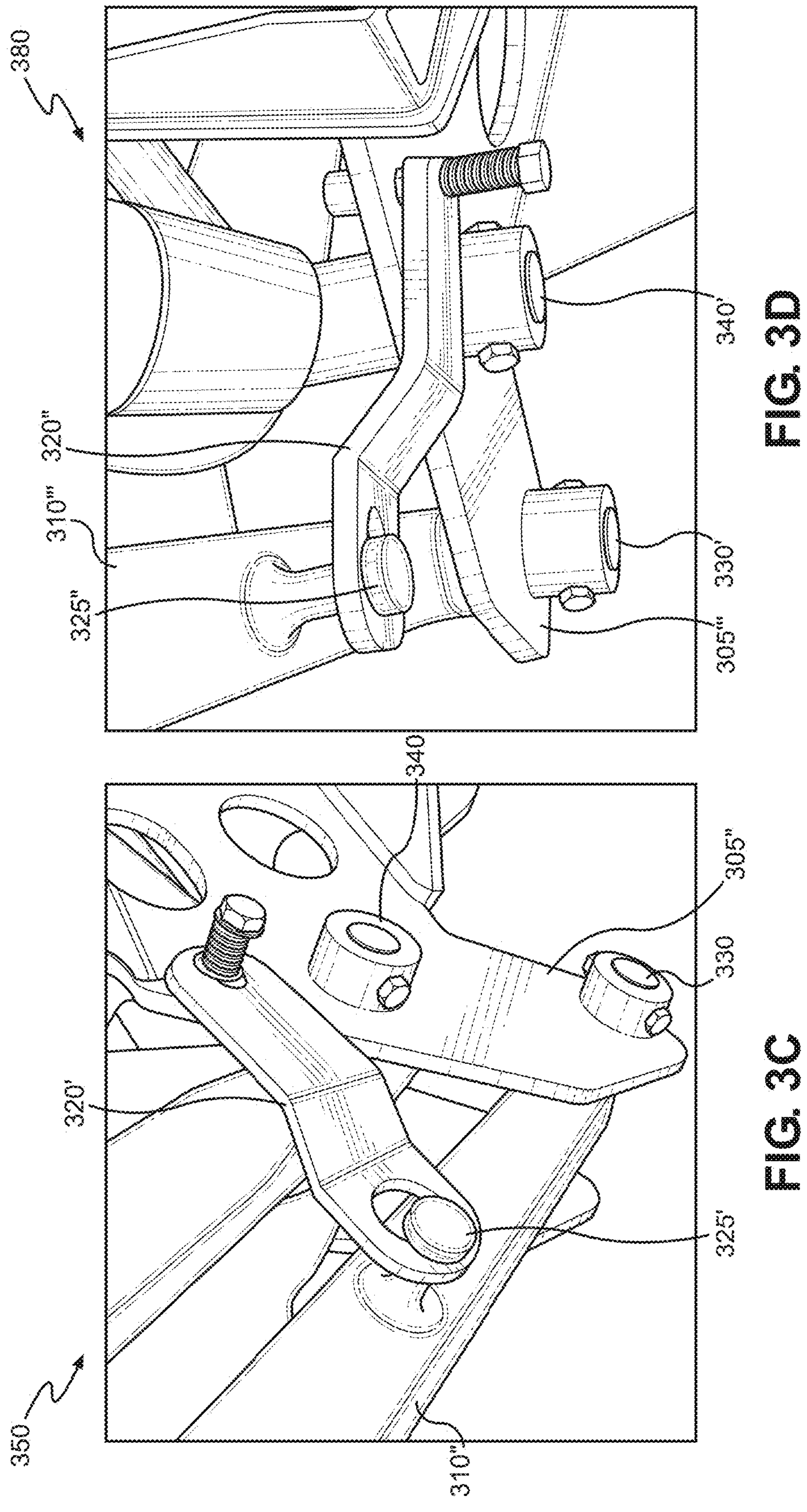
FIG. 3C shows a rear side of a vehicle showing another arm/pin latching mechanism to maintain a stabilizer arm in a storage position.
FIG. 3D shows a rear side of a vehicle showing yet another arm/pin latching mechanism to maintain a stabilizer arm in a storage position.

FIG. 3C shows a rear side of a vehicle 350 showing an arm 320' and a pin 325' of an arm/pin latching mechanism to maintain a stabilizer arm 310" in a storage position. As shown in FIG. 3C, the vehicle 350 includes a frame 305' and stabilizer arms 310" (only one shown) attached to the frame at respective pivots. As shown in FIG. 3C, with this arrangement, the arm 320' (which is attached to the frame) is rotated and shifted laterally to engage the pin 325' (which is attached to the stabilizer arm) such that the arm/pin latching mechanism holds the stabilizer arm 310" in the storage position. Consequently, the stabilizer arm 310" is prevented from inadvertently hitting the ground. As noted above, this arrangement requires an operator to perform some action other than normal backhoe function to engage the lock. That is, this approach requires an operator to rotate and laterally shift the arm 320' to engage/disengage the pin 325' to engage and/or disengage the arm/pin latching mechanism.

FIG. 3D shows a rear side of a vehicle 380 showing yet another an arm 320" and a pin 325' of an arm/pin latching mechanism to maintain a stabilizer arm 310'" in a storage position. As shown in FIG. 3D, the vehicle 380 includes a frame 305'" and stabilizer arms 310'" (only one shown) attached to the frame at respective pivots. As shown in FIG. 3D, with this arrangement, the arm 320" (which is attached to the frame) is rotated and shifted laterally to engage the pin 325" (which is attached to the stabilizer arm) such that the arm/pin latching mechanism holds the stabilizer arm 310'" in the storage position. Consequently, the stabilizer arm 310'" is prevented from inadvertently hitting the ground (even in the event hydraulic fluid leaks from the cylinder). As noted above, however, this arrangement requires an operator to perform some action other than normal backhoe function to engage the lock. That is, this approach requires an operator to rotate and laterally shift the arm 320" to engage/disengage the pin 325" to engage and/or disengage the arm/pin latching mechanism.

Thus, as explained above, these approaches of FIGS. 3A-3D each require an operator to perform some action other than normal backhoe function to engage and/or disengage the lock. That is, each of these approaches require an operator to a manual latching/unlatching to engage and/or disengage the latch.

Figure 4:
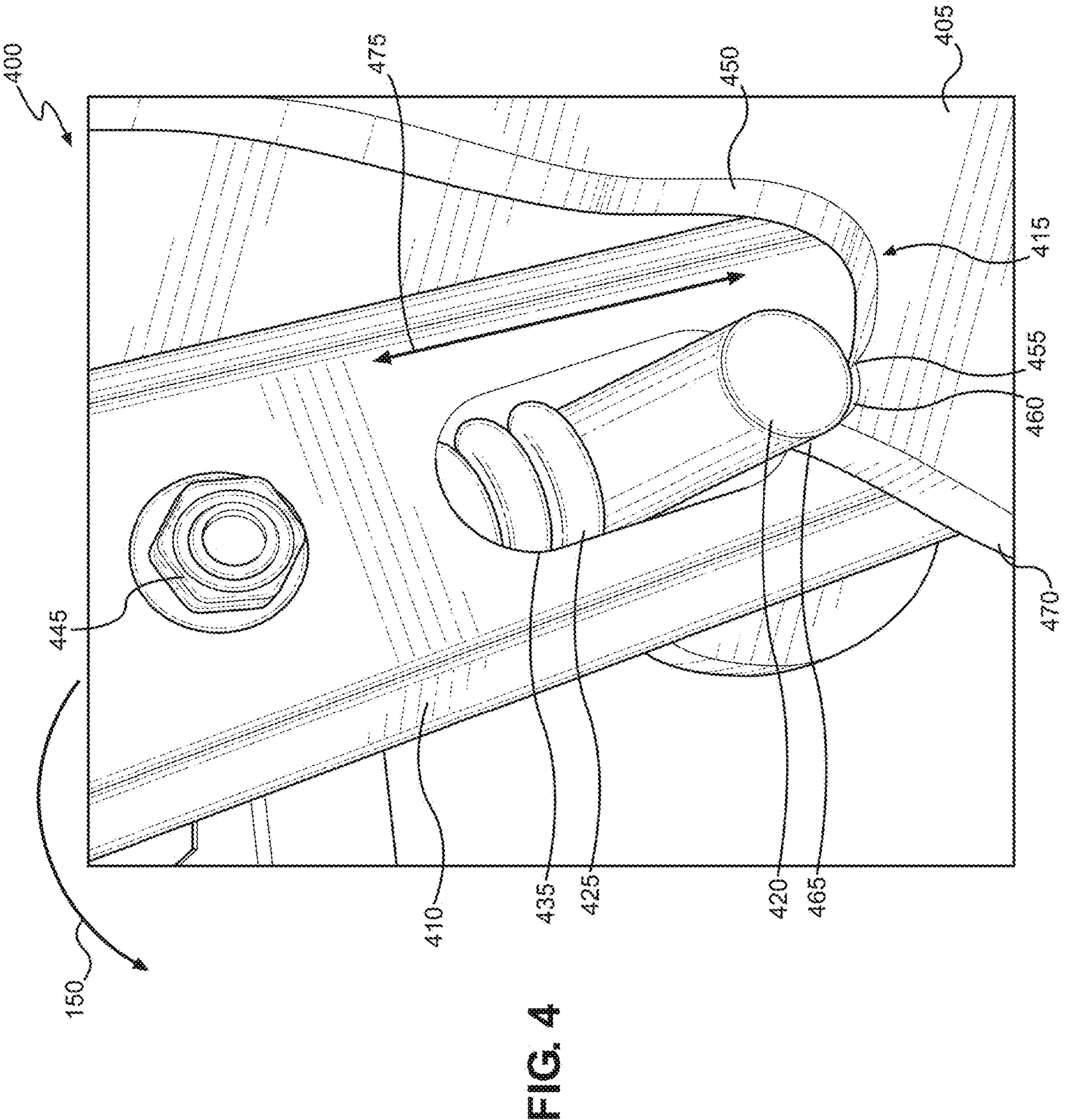
FIG. 4 shows a stabilizer arm lock (or locking mechanism) in accordance with aspects of the disclosure.

FIG. 4 shows a stabilizer arm lock (or locking mechanism) 400 in accordance with aspects of the disclosure. As shown in FIG. 4, the backhoe tractor includes a frame 405 (or stabilizer plate) and stabilizer arms 410 (only one shown) attached to the frame at respective pivots (not shown). The stabilizer arms 410 are lowered from a raised storage position (shown in FIG. 4) in a direction 150 to a deployed position (not shown), in which the feet of the stabilizer arms 410 are maintained in contact with the ground. As shown in FIG. 4, the locking mechanism 400 includes a locking pin 420, which is operable to shift in relative direction 475 in a slot-shaped opening 435 in the stabilizer arm 410. As shown in FIG. 4, a biasing member (e.g., a spring) 425 is arranged in the stabilizer arm 410 and maintained in relative position therein via a restrainer (e.g., a bolt) 445 passing through walls of the stabilizer arm 410. The biasing member or spring 425 is operable to bias the locking pin 420 downwardly towards the cam surface 415 formed on the frame 405 to engage with the stabilizer plate on the backhoe main frame. In accordance with aspects of the disclosure, when the stabilizer cylinder is collapsed (e.g., the stabilizer arm is in a “stored” position) the locking pin 420 inside the stabilizer arm 410 will engage with the lock position on the cam surface 415 of the frame 405 (or stabilizer plate).

In accordance with further aspects of the disclosure, when the stabilizer cylinder is extended the hydraulic force of the cylinder overcomes the lock, “raising” the locking pin 420 out of the lock position on the cam surface 415. As shown in FIG. 4, the cam surface 415 includes an assembly position 450, a lock position 460, and a usage range 470. Additionally, the cam surface 415 includes a first transition point 455 between the assembly position 450 and the lock position 460, and a second transition point 465 between the lock position 460 and the usage range 470. As the stabilizer arm 410 is lowered in direction 150 (e.g., via the hydraulic cylinder) from the storage position, the locking pin 420 moves within the opening 435 in direction 475 against the biasing force of the spring 425 to move from contact with the storage position 460, over the second transition point 465, and into contact with the usage range 470 of the cam surface 415. As the stabilizer arm 410 is raised (e.g., via the hydraulic cylinder) opposite to direction 150 from a deployed position to the storage position, the locking pin 420 moves within the opening 435 in direction 475 against the biasing force of the spring 425 to move from contact with the usage range 470 of the cam surface 415, over the second transition point 465, and into contact with the storage position 460 of the cam surface 415.

Additionally, as the stabilizer arm 110 is raised (e.g., manually by an operator) from the storage position to an assembly position, the locking pin 420 moves within the opening 435 in direction 475 against the biasing force of the spring 425 to move from contact with the lock position 460, over the first transition point 455, and into contact with the assembly position 450. In accordance with aspects of the disclosure, the assembly position 450 of the cam surface 415 is configured so that when the locking pin is in contact with the assembly position 450, the locking pin 420 does not compress the spring 425. As the stabilizer arm 110 is lowered (e.g., manually by an operator) from the assembly position to the storage position, the locking pin 420 moves within the opening 435 in direction 475 against the biasing force of the spring 425 to move from contact with the assembly position range 450, over the first transition point 455, and into contact with the lock position 460.

Figures 5A, 5B:
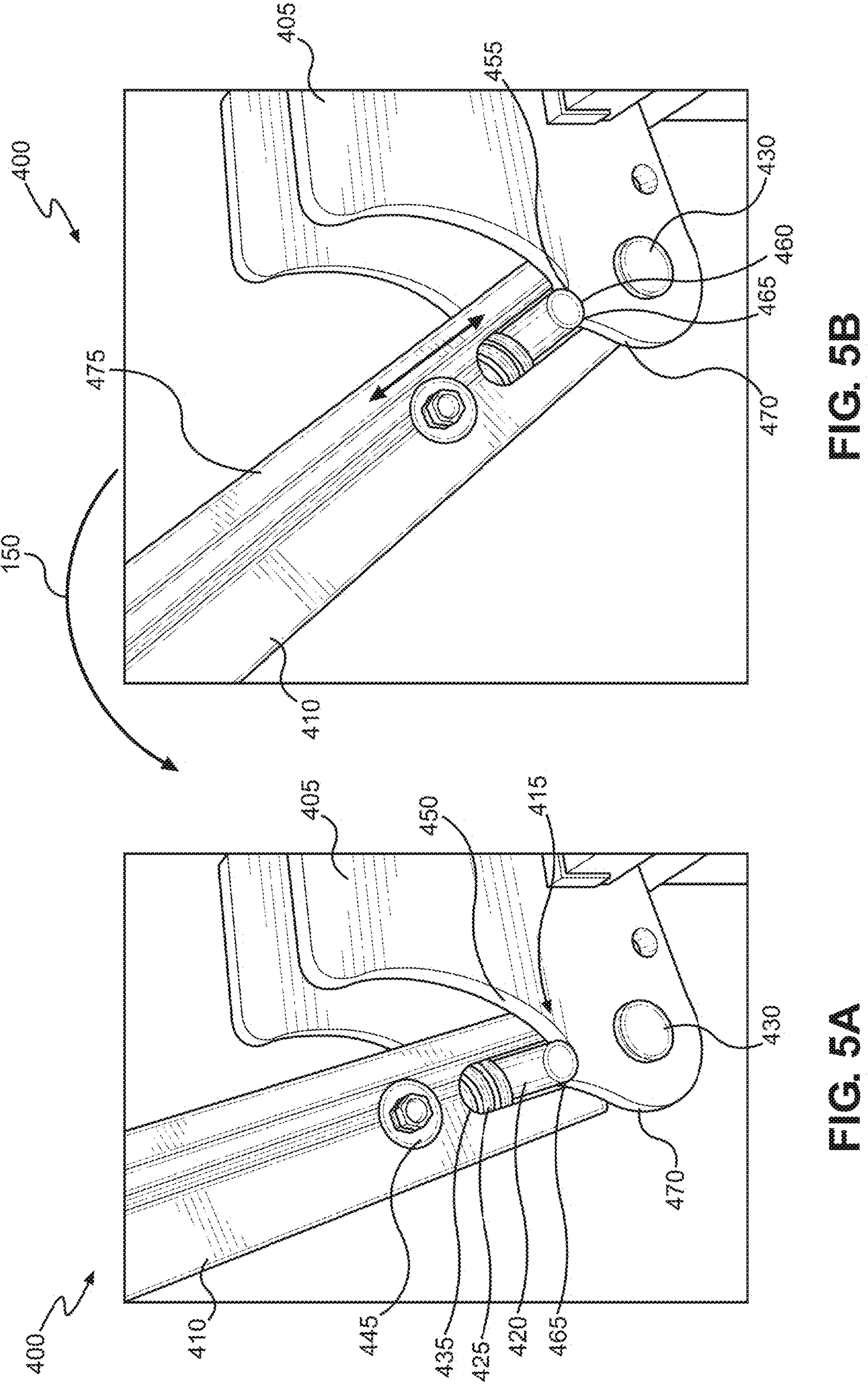
FIGS. 5A and 5B show the stabilizer arm lock (or locking mechanism) with the stabilizer arm in different positions in accordance with aspects of the disclosure.

FIGS. 5A and 5B show the stabilizer arm lock (or locking mechanism) 400 with the stabilizer arm in different positions in accordance with aspects of the disclosure. FIG. 5A shows the frame 405 (e.g., test frame) and a stabilizer arm 410 attached to the frame 405 at pivot 430 (e.g. a bolt or shaft). As shown in FIG. 5A, the stabilizer arm 410 is in the raised storage position with the locking pin 420 engaged with the lock position 460 of the cam surface 415 between the first transition point 455 and the second transition point 465. The locking pin 420 is biased towards the cam surface by the spring 425. In such a manner, in accordance with aspects of the disclosure, the engagement of the locking pin 420 with the with the lock position 460 of the cam surface 415 (between the first transition point 455 and the second transition point 465) is operable to maintain the stabilizer arm 410 in the storage position. Consequently, the stabilizer arm 410 in the lock position (or in the assembly position) is prevented from inadvertently hitting the ground. Thus, when the stabilizer cylinder is collapsed (such that the stabilizer arm is a "stored" position) the locking pin 420 inside the stabilizer arm 410 will engage with the lock position on the cam surface 415 of the frame 405 (or stabilizer plate) to maintain the stabilizer arm 410 in the stored position.

In such a manner, in accordance with aspects of the disclosure, a user can ensure the stabilizer arms remain locked in the storage position without needing to manually engage a latching mechanism. The stabilizer arm lock does not require operator to perform some action other than normal backhoe function to engage and/or disengage the lock. That is, a user by merely raising the stabilizer arm with the hydraulic cylinder to the storage position, will automatically engage the stabilizer arm lock. Additionally, a user by merely lowering the stabilizer arm with the hydraulic cylinder from the storage position to a deployed position, will automatically disengage the stabilizer arm lock. In such a manner, a user can more efficiently and safely operate the vehicle when deploying (lowering) the stabilizer arms and when the stabilizer arms are stored (or being raised).

As shown in FIGS. 5A and 5B, the biasing member (e.g., a spring) 425 is arranged in the stabilizer arm 410 and maintained in relative position therein via the restrainer 445 (e.g., a bolt) passing through walls of the stabilizer arm 410. The biasing member or spring 425 is operable to bias the locking pin 420 downwardly towards the cam surface 415 formed on the frame 405. As shown in FIG. 5B, as the stabilizer arm 410 is lowered in direction 150 (via the hydraulic cylinder, not shown) from the storage position, the locking pin 420 is pushed upwardly within the opening 435 in direction 475 by the second transition point 465 against the biasing force of the spring 425 to move from contact with the storage position 460 over the second transition point 465 and into contact with the usage range 470 of the cam surface 415. Thus, in accordance with further aspects of the disclosure, when the stabilizer cylinder is extended the hydraulic force of the cylinder overcomes the lock, "raising" the locking pin 420 out of the lock position on the cam surface 415.

Similarly, when the stabilizer arm 410 is raised (opposite to direction 150) via the hydraulic cylinder (not shown) from the usage range 470 to the storage position, the locking pin 420 is pushed upwardly within the slot-shaped opening 435 in direction 475 against the biasing force of the spring 425 to move from contact with the usage range 470 over the second transition point 465 and into contact with the storage position 460 of the cam surface 415.

In such a manner and in accordance with additional aspects of the disclosure, a user can move the stabilizer arms 410 into and out of the locked storage position (via the respective hydraulic cylinders) without needing to manually dis-engage a latching mechanism. That is, the stabilizer arm lock 400 does not require operator to perform some action other than normal backhoe function to engage and/or disengage the lock. In such a manner, a user can more efficiently and safely operate the vehicle when deploying (lowering) the stabilizer arms and when the stabilizer arms are stored (or being raised).

Figure 6B:
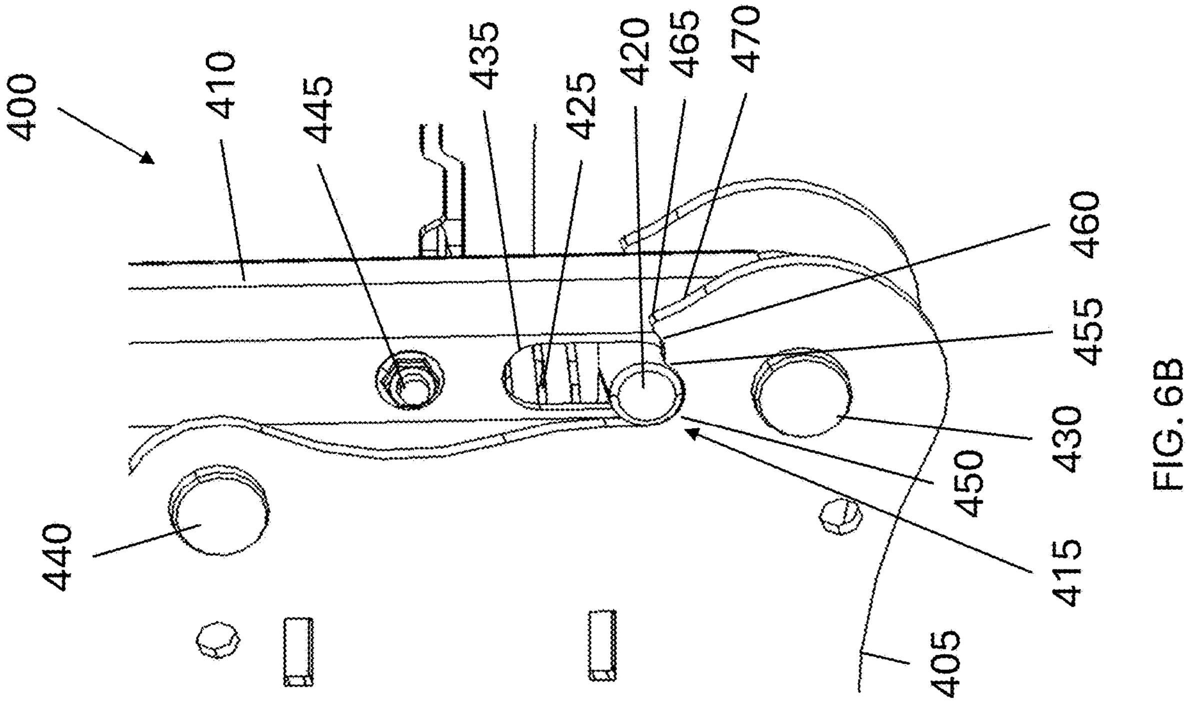
FIGS. 6A and 6B show exemplary depictions of left and right side stabilizer arm locks (or locking mechanisms) with the stabilizer arms in an assembly position in accordance with aspects of the disclosure.
Figure 6A:
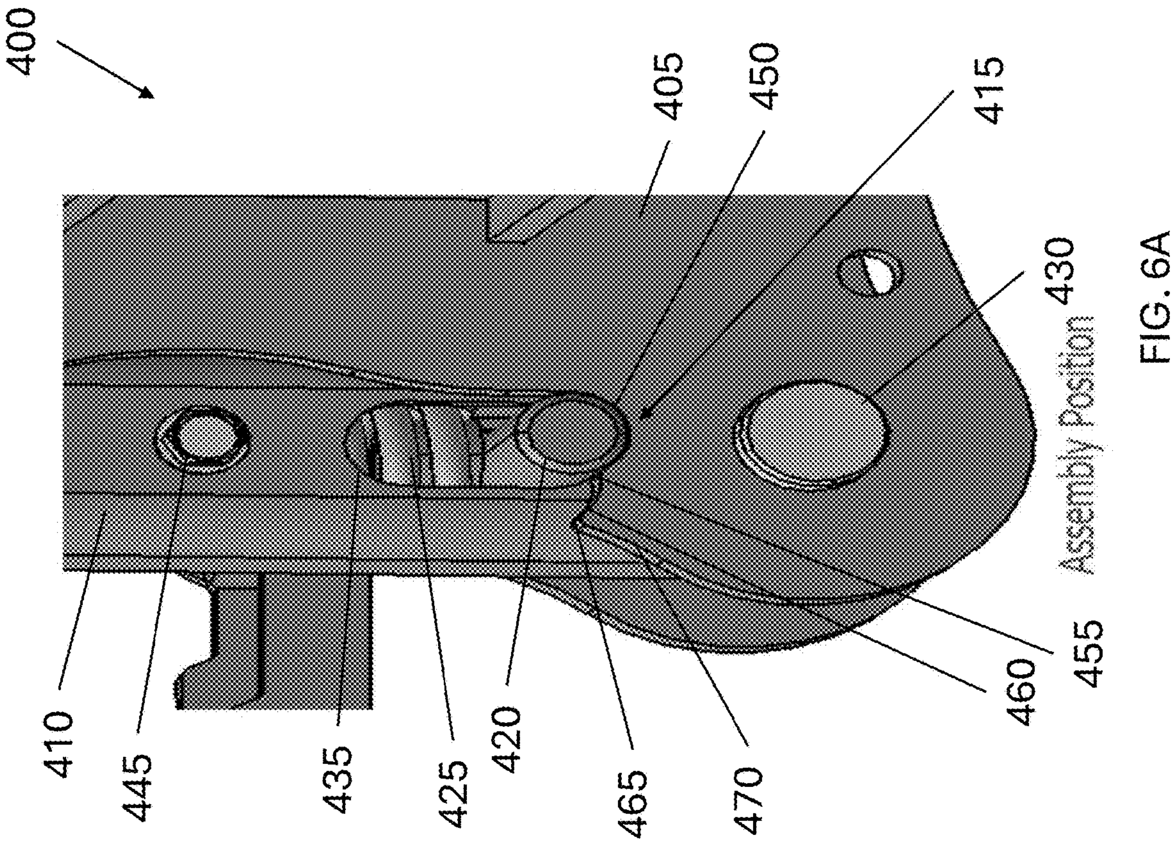

FIGS. 6A and 6B show exemplary depictions of left and right side stabilizer arm locks 400 (or locking mechanisms) with the stabilizer arms in an assembly position in accordance with aspects of the disclosure. In accordance with aspects of the disclosure, the assembly position 450 of the cam surface 415 is configured so that when the locking pin is in contact with the assembly position 450, the locking pin

420 does not compress the spring 425. As shown in FIGS. 6A and 6B, the biasing member (e.g., a spring) 425 is arranged in the stabilizer arm 410 and maintained in relative position therein via the restrainer 445 (e.g., a bolt) passing through walls of the stabilizer arm 410. The locking pin 420 passes through the slot-shaped opening 435 in the stabilizer arm 410 and the biasing member 425 contacts a side of the locking pin 420. The locking pin 420 includes a stem operable to retain the locking pin 420 positioned relative to the biasing member 425 (e.g., prevent rotation of the locking pin 420 in the slot-shaped opening 435). The biasing member or spring 425 is operable to bias the locking pin 420 downwardly towards the cam surface 415 formed on the frame 405. However, as explained above, when the locking pin is in contact with the assembly position 450, the locking pin 420 does not compress the spring 425. As shown in FIGS. 6A and 6B, the stabilizer arm lock 400 includes the frame 405 and a stabilizer arm 410 attached to the frame 405 at pivot 430 (e.g. a bolt or shaft). As shown in FIG. 6B, a cylinder (not shown) is attached to the frame 405 at pivot 440 (e.g. a bolt or shaft).

As shown in FIGS. 6A and 6B, the stabilizer arm 410 is in the assembly position with the locking pin 420 engaged with the assembly position 450 of the cam surface 415 between an end of the cam surface 415 and the first transition point 455. The locking pin 420 is biased towards the cam surface by the spring 425 (except when in the assembly position, as explained above). In accordance with aspects of the disclosure, the stabilizer arm 410 may be positioned in a configuration more suitable for easier and/or more efficient assembly of elements of the vehicle. For example, an operator can move the stabilizer arm 410 from the storage position to the assembly position by overcoming the first transition point 455 so prepare for cylinder assembly.

Figures 7A, 7B:
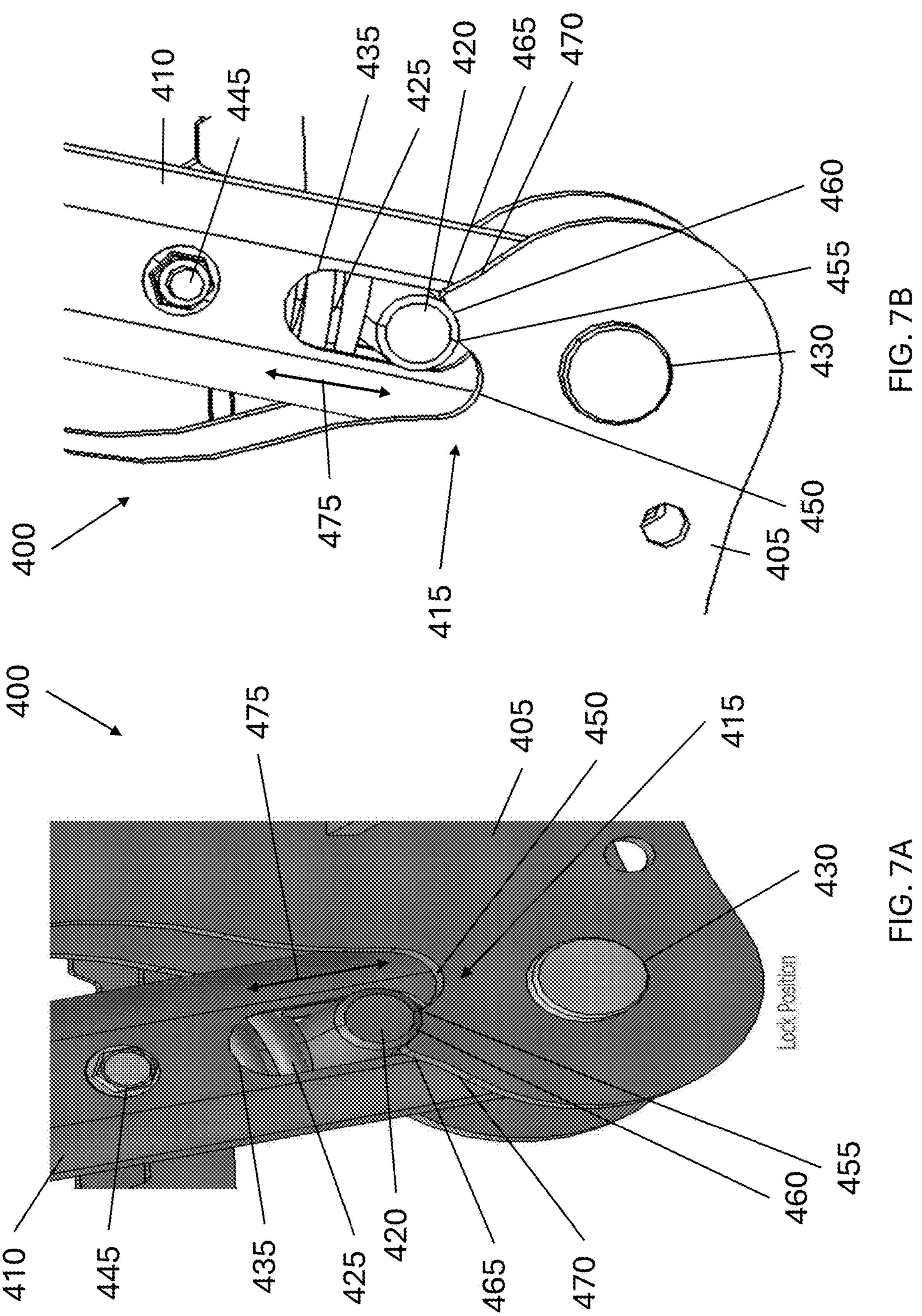
FIGS. 7A and 7B show exemplary depictions of left and right side stabilizer arm locks (or locking mechanisms) with the stabilizer arm in a lock position in accordance with aspects of the disclosure.

FIGS. 7A and 7B show exemplary depictions of left and right side stabilizer arm locks 400 (or locking mechanisms) with the stabilizer arm in a lock position in accordance with aspects of the disclosure. As shown in FIGS. 7A and 7B, the biasing member (e.g., a spring) 425 is arranged in the stabilizer arm 410 and maintained in relative position therein via the restrainer 445 (e.g., a bolt) passing through walls of the stabilizer arm 410. The locking pin 420 passes through the slot-shaped opening 435 in the stabilizer arm 410 and the biasing member 425 contacts a side of the locking pin 420. The locking pin 420 includes a stem operable to retain the locking pin 420 positioned relative to the biasing member 425 (e.g., prevent rotation of the locking pin 420 in the slot-shaped opening 435). The biasing member or spring 425 is operable to bias the locking pin 420 "downwardly" (along direction 475) towards the cam surface 415 formed on the frame 405. As shown in FIGS. 7A and 7B, the stabilizer arm lock 400 includes the frame 405 and a stabilizer arm 410 attached to the frame 405 at pivot 430 (e.g. a bolt or shaft).

As shown FIGS. 7A and 7B, the stabilizer arm 410 is in the lock position with the locking pin 420 engaged with the lock position 460 of the cam surface 415 between the first transition point 455 and the second transition point 465. The locking pin 420 is biased towards the cam surface by the spring 425. In such a manner, in accordance with aspects of the disclosure, the engagement of the locking pin 420 with the with the lock position 460 of the cam surface 415 (between the first transition point 455 and the second transition point 465) is operable to maintain the stabilizer arm 410 in the lock position. Consequently, the stabilizer arm 410 is prevented from inadvertently hitting the ground.

In accordance with aspects of the disclosure, a user can ensure the stabilizer arms remain locked in the storage position without needing to manually engage a latching mechanism. The stabilizer arm lock does not require operator to perform some action other than normal backhoe function of raising and/or lowering the stabilizer arms to engage and/or disengage the stabilizer arm lock. In such a manner, a user can more efficiently and safely operate the vehicle when the stabilizer arm 410 is not in use and in the storage position.

Figures 8A, 8B:
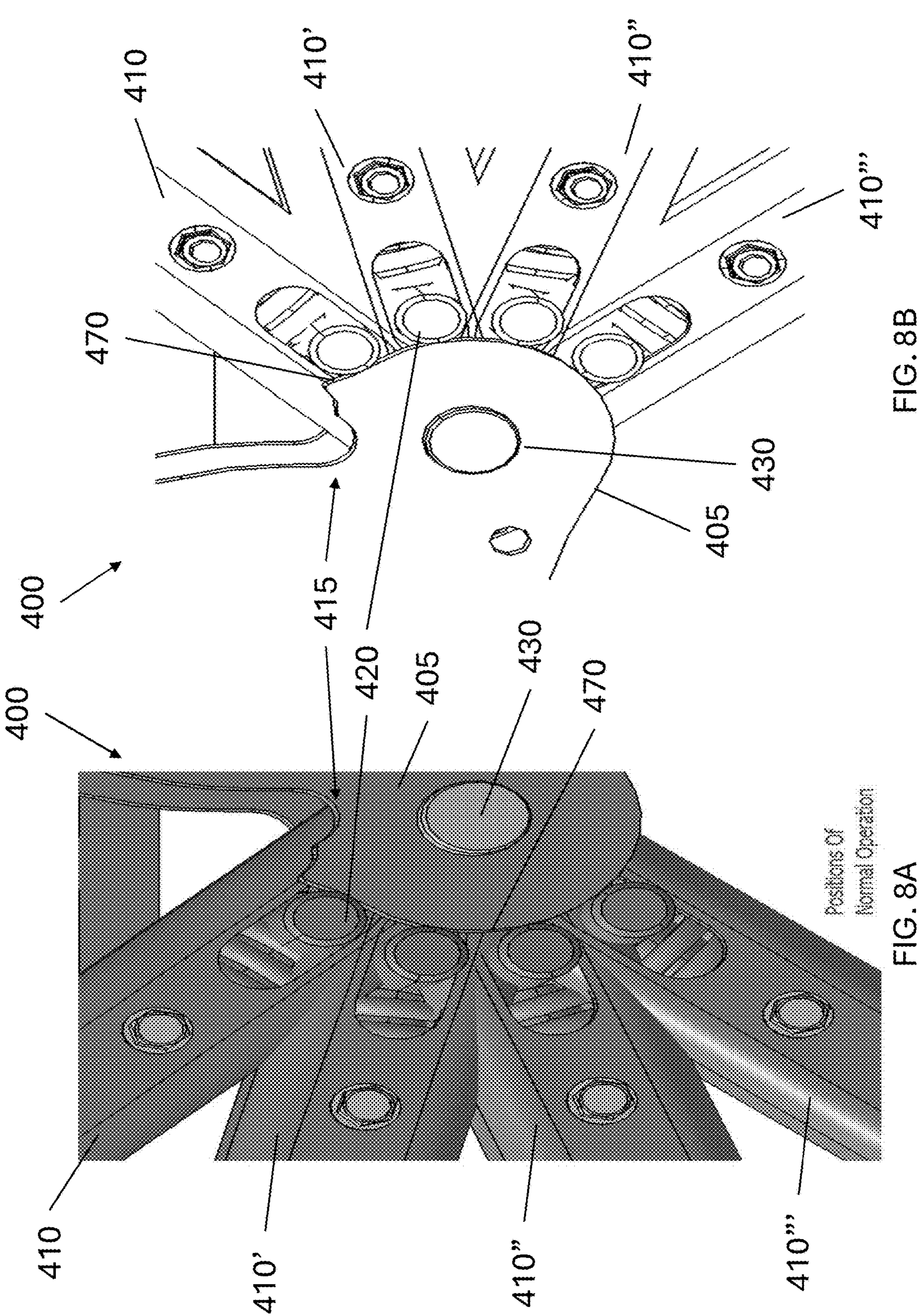
FIGS. 8A and 8B show exemplary depictions of left and right side stabilizer arm locks (or locking mechanisms) with the stabilizer arm shown in various positions in the usage range in accordance with aspects of the disclosure.

FIGS. 8A and 8B show exemplary depictions of left and right side stabilizer arm locks 400 (or locking mechanisms) with the stabilizer arm shown in various positions in the usage range in accordance with aspects of the disclosure. As shown in FIGS. 8A and 8B, the stabilizer arm 410 is in usage position (or positions of normal operation) with the locking pin 420 engaged with the usage range 470 of the cam surface 415 beyond the second transition point 465. The locking pin 420 is biased towards the cam surface by the spring 425. In such a manner, in accordance with aspects of the disclosure, once the hydraulic cylinder moves the stabilizer arm 410 such that the locking pin 420 is forced over the second transition point 465 of the cam surface 415, the stabilizer arm 410 is "unlocked" and can "freely rotate" via the hydraulic cylinder around pivot 430 through the range of deployed (or usage) positions with the locking pin 420 biased into contact with the usage range 470 of the cam surface 415.

Figure 9:
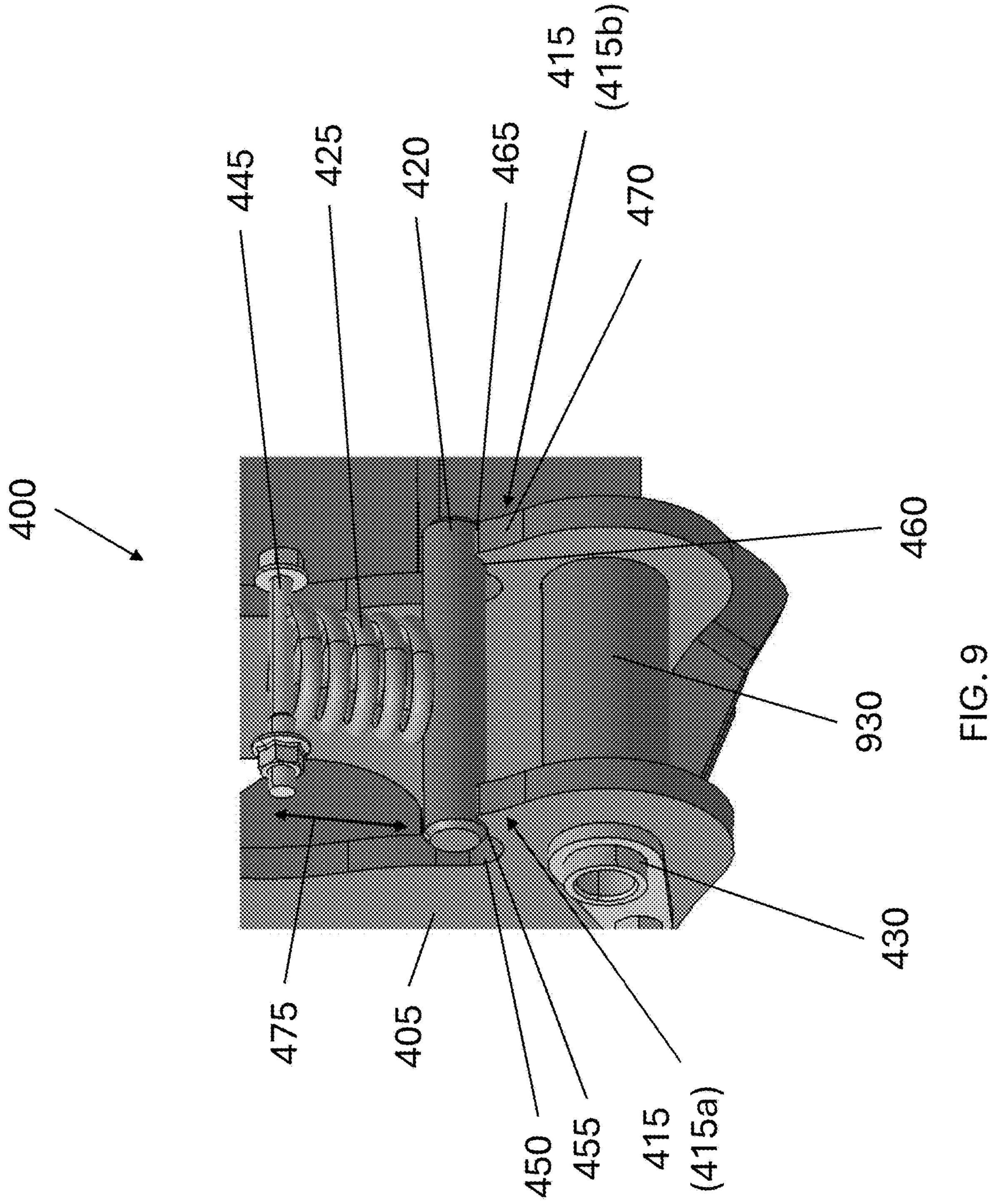
FIG. 9 shows an exemplary depiction of a stabilizer arm lock (or locking mechanisms) with the stabilizer arm in a lock position and with the stabilizer arm not shown to depict elements therein in accordance with aspects of the disclosure.

FIG. 9 shows an exemplary depiction of a stabilizer arm lock (or locking mechanism) 400 with the stabilizer arm in a lock position and with the stabilizer arm not shown to depict elements therein in accordance with aspects of the disclosure. As shown in FIG. 9, the biasing member (e.g., a spring) 425 is arranged in the stabilizer arm (not shown) and maintained in relative position therein via the restrainer 445 (e.g., a bolt) passing through walls of the stabilizer arm (not shown). The locking pin 420 passes through the slot-shaped opening (not shown) in the stabilizer arm (not shown) and the biasing member 425 contacts a side of the locking pin 420. The locking pin 420 includes a stem operable to retain the locking pin 420 positioned relative to the biasing member 425 (e.g., prevent rotation of the locking pin 420 in the slot-shaped opening 435). The biasing member or spring 425 is operable to bias the locking pin 420 downwardly (along direction 475) towards the cam surfaces 415 on each side that are formed on the frame 405. That is, as shown in FIG. 9, the cam surface 415 includes a first cam surface 415*a* and a second cam surface 415*b* spaced from the first cam surface in a direction parallel to a pivoting axis direction of the stabilizer arm. The locking pin 420 is maintained in contact with the first cam surface 415*a* and second cam surface 415*b*. As shown in FIG. 9, the stabilizer arm lock 400 includes the frame 405 and a stabilizer arm (not shown) having a bearing 930 attached to the frame 405 at pivot 430 (e.g. a bolt or shaft).

As shown FIG. 9, the stabilizer arm (not shown) is in the lock position with the locking pin 420 engaged with the lock position 460 of the cam surfaces 415 between the first transition point 455 and the second transition point 465. The locking pin 420 is biased towards the cam surfaces 415 by the spring 425. In such a manner, in accordance with aspects of the disclosure, the engagement of the locking pin 420 with the with the lock position 460 of the cam surface 415 (between the first transition point 455 and the second transition point 465) is operable to maintain the stabilizer arm 410 in the lock position. Consequently, the stabilizer arm 410 is prevented from inadvertently hitting the ground.

In accordance with aspects of the disclosure, a user can ensure the stabilizer arms remain locked in the storage position without needing to manually engage a latching mechanism. The stabilizer arm lock does not require operator to perform some action other than normal backhoe function to engage and/or disengage the lock. In such a manner, a user can more efficiently and safely operate the vehicle when the stabilizer arm 410 is not in use and in the storage position and can more efficiently and safely operate the vehicle when the stabilizer arm 410 is deployed and stored.

Figure 10:
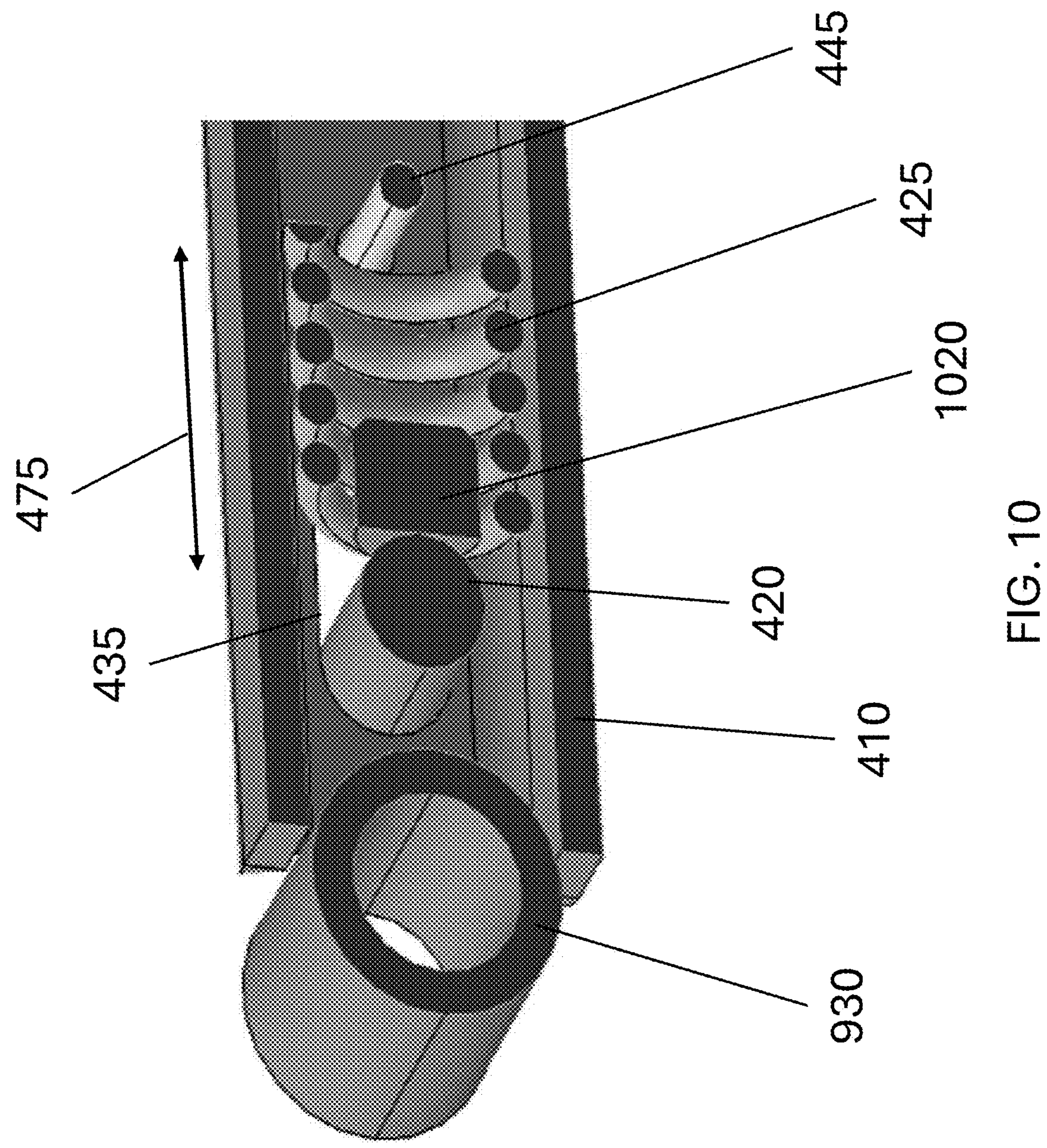
FIG. 10 shows an exemplary perspective sectional view of a stabilizer arm of the stabilizer arm lock (or locking mechanisms) in accordance with aspects of the disclosure.

FIG. 10 shows an exemplary perspective sectional view of a stabilizer arm 410 of the stabilizer arm lock (or locking mechanisms) 400 in accordance with aspects of the disclosure. As shown in FIG. 10, the biasing member (e.g., a spring) 425 is arranged in the stabilizer arm 410 and maintained in relative position therein via the restrainer 445 (e.g., a bolt) passing through walls of the stabilizer arm 410. The locking pin 420 passes through the slot-shaped openings (one shown) in the stabilizer arm 410 and the biasing member 425 contacts a side of the locking pin 420. The slot-shaped opening 435 may be sized to have its smaller dimension to be slightly larger than the diameter of the locking pin 420. The locking pin 420 includes a stem 1020 operable to retain the locking pin 420 positioned relative to the biasing member 425 (e.g., prevent rotation of the locking pin 420 in the slot-shaped opening 435). The stem 1020 may be sized to have a diameter to be slightly smaller than the inner diameter of the spring 425. The biasing member or spring 425 (in contact with the restrainer 445) is operable to bias the locking pin 420 along direction 475 towards the cam surface 415 on each side of the frame (not shown). As shown in FIG. 10, the stabilizer arm includes a bearing 930 for attaching to the frame at a pivot (not shown).

Figure 11:
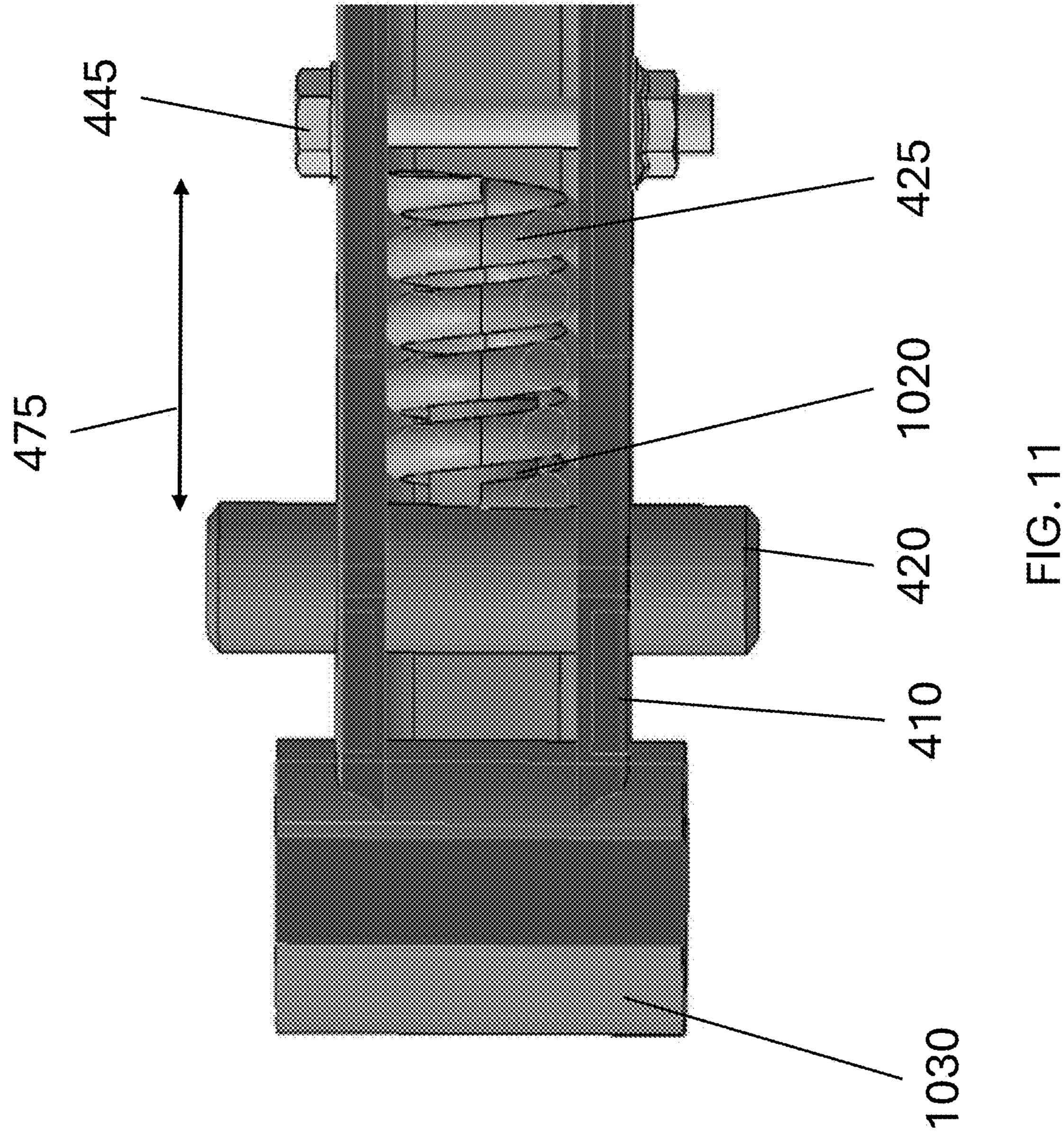
FIG. 11 shows an exemplary top sectional view of a stabilizer arm of the stabilizer arm lock (or locking mechanisms) in accordance with aspects of the disclosure.

FIG. 11 shows an exemplary top sectional view of a stabilizer arm of the stabilizer arm lock (or locking mechanisms) in accordance with aspects of the disclosure. As shown in FIG. 11, the biasing member (e.g., a spring) 425 is arranged in the stabilizer arm 410 and maintained in relative position therein via the restrainer 445 (e.g., a bolt) passing through walls of the stabilizer arm 410. The locking pin 420 passes through the slot-shaped openings in the stabilizer arm 410 and the biasing member 425 contacts a side of the locking pin 420. The locking pin 420 includes a stem 1020 operable to retain the locking pin 420 positioned relative to the biasing member 425 (e.g., prevent rotation of the locking pin 420 in the slot-shaped opening 435). The biasing member or spring 425 is operable to bias the locking pin 420 along direction 475 towards the cam surface on each side of the frame (not shown). As shown in FIG. 11, the stabilizer arm includes a bearing 930 for attaching to the frame at pivot (not shown).

Figure 12:
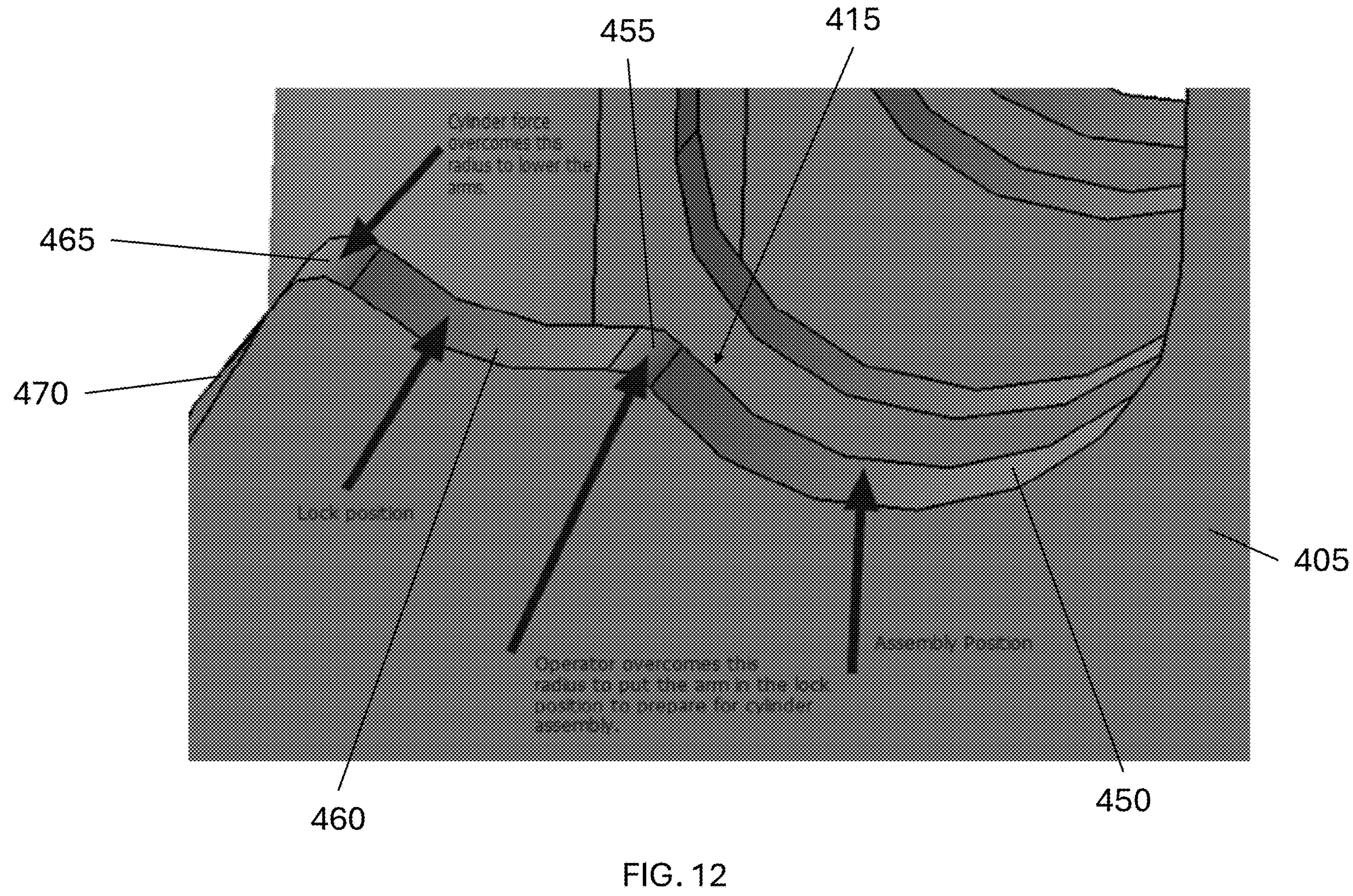
FIG. 12 shows an exemplary perspective view of a cam surface of the stabilizer arm lock (or locking mechanisms) in accordance with aspects of the disclosure.

FIG. 12 shows an exemplary perspective view of a cam surface 415 of the stabilizer arm lock (or locking mechanisms) in accordance with aspects of the disclosure. In embodiments, the cam surface 415 may be laser cut to provide a precise profile to the cam surface 415. As shown in FIG. 12, the cam surface 415 includes an assembly position range 450, a lock position 460, and a usage range 470. Additionally, the cam surface 415 includes a first transition point 455 between the assembly position range 450 and the lock position 460, and a second transition point 465 between the lock position 460 and the usage range 470. In accordance with aspects of the disclosure, as the stabilizer arm (not shown) is lowered from an assembly position to the storage position, the locking pin (not shown) moves from contact with the assembly position 450, over the first transition point 455, and into contact with the lock position 460. Also, the stabilizer arm (not shown) may be raised (e.g., manually by an operator) from the storage position to an assembly position, the locking pin (not shown) moves from contact with the lock position 460, over the first transition point 455, and into contact with the assembly position 450. For example, an operator can move the stabilizer arm (not shown) from the storage position to the assembly position by overcoming the first transition point 455 so prepare for cylinder assembly. Thus, the first transition point 455 is configured so as to maintain the stabilizer arm 410 in the storage position, while permitting a manual operation (with sufficient force) between the lock position 460 and the assembly position (and vice versa), and the second transition point 465 is configured so as to prevent movement of the stabilizer arm 410 from the storage position absent actuation of the hydraulic cylinder (and vice versa).

Additionally, as the stabilizer arm (not shown) is lowered via the cylinder from the storage position, the locking pin (not shown) moves from contact with the storage position 460, over the second transition point 465, and into contact with the usage range 470 of the cam surface 415 to lower the stabilizer arm.

Figure 13:
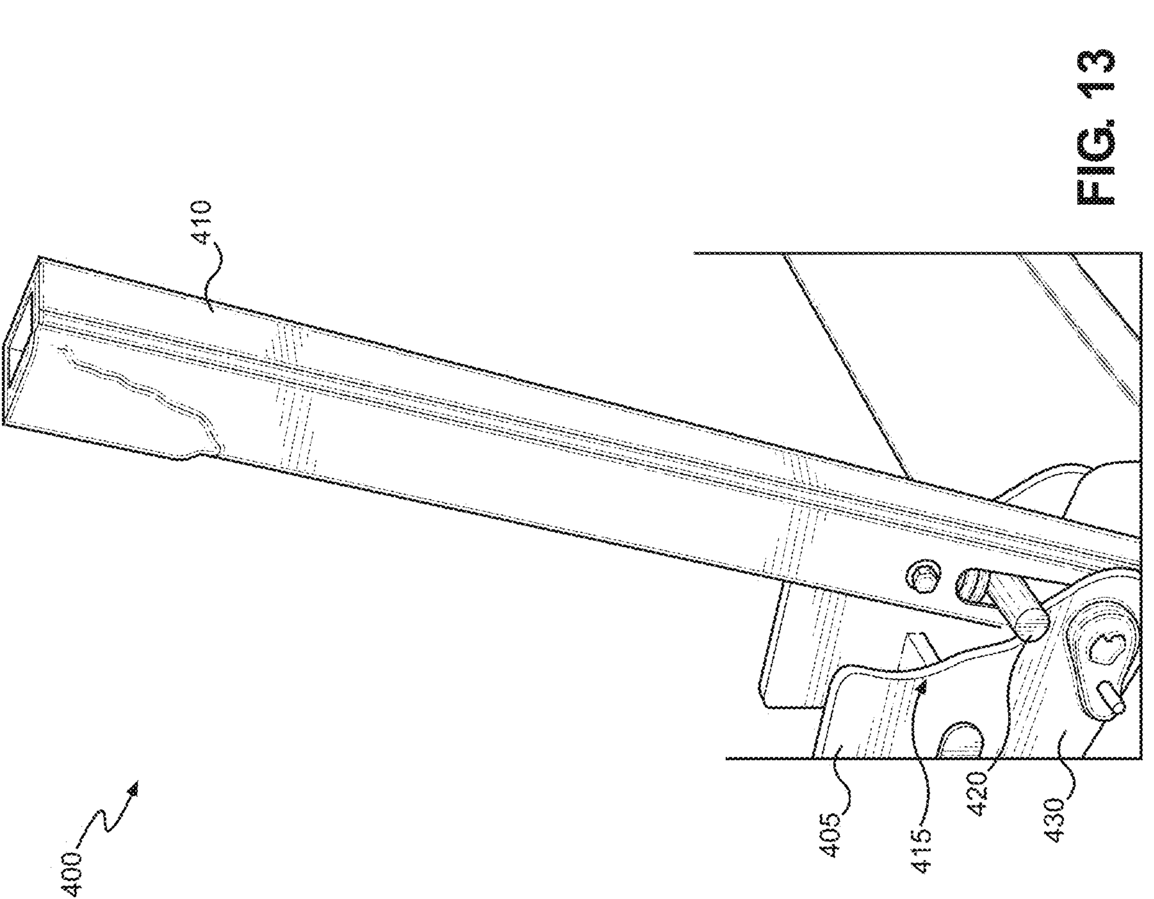
FIG. 13 shows a stabilizer arm lock (or locking mechanism) in accordance with aspects of the disclosure.

FIG. 13 shows an exemplary stabilizer arm lock (or locking mechanism) 400 in accordance with aspects of the disclosure. As shown in FIG. 13, the stabilizer arm lock (or locking mechanism) 400 includes a frame 405 and a stabilizer arm 410 attached to the frame 405 at a pivot 430. As shown in FIG. 13, the locking mechanism 400 includes a locking pin 420, which is operable to shift in relative direction in an opening 435 in the stabilizer arm 410 and a biasing member or spring 425 is operable to bias the locking pin 420 towards the cam surface 415 formed on the frame 405. The stabilizer arms 410 includes a foot (not shown) on the free end of the stabilizer arm 410.

While the disclosure has been described with reference to specific embodiments, those skilled in the art will understand that various changes may be made and equivalents may be substituted for elements thereof without departing from the true spirit and scope of the disclosure. For example, while the lock is described in terms of a stabilizer arm, the disclosure contemplates the lock being used on other arms of the back hoe, such as in king-post pivot and or the pivot between the boom arm and the dipper (or dipper-stick). That is, the lock could be used as a boom safety lock and/or a swing lock. Additionally, while the disclosure is directed to a lock that does not require manual intervention (e.g., beyond actuating the hydraulic cylinder) to lock or unlock the stabilizer arm, the disclosure contemplates a manual latch could also be utilized (e.g., during long-term storage or transportation of the vehicle).

While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

What is claimed is:

1. A stabilizer arm lock, comprising:
- a frame;
- a stabilizer arm having a first end pivotally attached to the frame;
- a locking pin operable to slidably move within the stabilizer arm;
- a cam surface on the frame; and
- a biasing member operable to bias the locking pin into engagement with the cam surface.

2. The stabilizer arm lock of claim 1, wherein engagement of the locking pin with a lock position of the cam surface is operable to maintain the stabilizer arm in the storage position.

3. The stabilizer arm lock of claim 1, wherein the stabilizer arm comprises a slot-shaped opening, and
- wherein the locking pin traverses the opening and is operable to slide in the opening towards and away from the cam surface.

4. The stabilizer arm lock of claim 1, wherein the stabilizer arm is operable to pivot from a storage position to a deployed position.

5. The stabilizer arm lock of claim 4, further comprising a cylinder connected to the frame and to the stabilizer arm, and operable to move the stabilizer arm from the storage position to the deployed position.

6. The stabilizer arm lock of claim 1, wherein the biasing member comprises a spring.

7. The stabilizer arm lock of claim 1, wherein the biasing member is arranged in an interior cavity of the stabilizer arm.

8. The stabilizer arm lock of claim 7, wherein the stabilizer arm further comprises a restrainer operable to maintain the biasing member in relative position within the stabilizer arm.

9. The stabilizer arm lock of claim 8, wherein the restrainer comprises a bolt traversing the stabilizer arm.

10. The stabilizer arm lock of claim 1, wherein the cam surface includes a lock position and a usage range.

11. The stabilizer arm lock of claim 10, wherein the cam surface further includes a second transition point between the lock position and the usage range.

12. The stabilizer arm lock of claim 11, wherein the second transition point between the lock position and the usage range is a protrusion on the cam surface.

13. The stabilizer arm lock of claim 11, wherein, as the stabilizer arm is lowered from a storage position, the locking pin moves within the stabilizer arm in direction against the biasing force of the spring to move from contact with the lock position of the cam surface, over the second transition point, and into contact with the usage range of the cam surface.

14. The stabilizer arm lock of claim 10, wherein the cam surface further includes an assembly position.

15. The stabilizer arm lock of claim 14, wherein the cam surface further includes a first transition point between the assembly position and the lock position.

16. The stabilizer arm lock of claim 15, wherein the first transition point between the lock position and the assembly position is a protrusion on the cam surface.

17. The stabilizer arm lock of claim 15, wherein, as the stabilizer arm is moved from the storage position to the assembly position, the locking pin moves within the stabilizer arm in direction against the biasing force of the spring to move from contact with the storage position, over the first transition point, and into contact with the assembly position of the cam surface.

18. The stabilizer arm lock of claim 10, wherein the biasing force of the spring pressing the locking pin into contact with the lock position is greater than a rotational gravitational force acting on the stabilizer arm, such that the stabilizer arm in a storage position does not move out of the storage position due to the rotational gravitational force acting on the stabilizer arm.

19. The stabilizer arm lock of claim 1, wherein the locking pin comprises a stem extending perpendicularly to a longitudinal direction of the locking pin and along a direction of movement of the locking pin, wherein the stem is operable to retain the locking pin positioned relative to the biasing member.

20. A method of operating a stabilizer arm having a stabilizer arm lock, the stabilizer arm lock comprising a frame, the stabilizer arm, which includes a first end pivotally attached to the frame, a locking pin operable to slidably move within the stabilizer arm, a cam surface on the frame, and a biasing member operable to bias the locking pin into engagement with the cam surface, the method comprising:

moving the stabilizer arm from a usage position to a storage position, wherein the locking pin moves within the stabilizer arm in direction against the biasing force of the spring to move from contact with a usage range of the cam surface, over a protruding point on the cam surface, and into contact with a lock position of the cam surface, wherein a biasing force of the biasing member pressing the locking pin into contact with the lock position is greater than a rotational gravitational force acting on the stabilizer arm so as to lock the stabilizer arm in the storage position and prevent the stabilizer arm from inadvertently moving out of the storage position.

* * * * *